United States Patent [19]

Wilson

[11] Patent Number: 5,156,660
[45] Date of Patent: Oct. 20, 1992

US005156660A

[54] FILTER CLEANING APPARATUS

[76] Inventor: James H. Wilson, 421 Perkins Rd., Leesville, La. 71446

[21] Appl. No.: 723,193

[22] Filed: Jun. 28, 1991

[51] Int. Cl.$^5$ .............................................. B01D 46/04
[52] U.S. Cl. ...................................... 55/291; 55/294; 55/302; 55/304
[58] Field of Search ................... 55/291, 294, 302, 304; 15/301, 318, 312.1, 311

[56] References Cited

U.S. PATENT DOCUMENTS

| | | | |
|---|---|---|---|
| 1,321,490 | 11/1919 | Sweetland | 55/294 |
| 2,758,671 | 8/1956 | Silverman et al. | 55/294 |
| 3,173,776 | 3/1965 | Palmore | 55/294 |
| 3,636,680 | 1/1972 | Seidel | 55/291 |
| 4,496,377 | 1/1985 | Margraf | 55/291 |
| 4,560,396 | 12/1985 | O'Dell | 55/302 |

FOREIGN PATENT DOCUMENTS

| | | | |
|---|---|---|---|
| 1192501 | 8/1985 | Canada | 55/302 |
| 152511 | 7/1987 | Japan | 55/304 |
| 1000077 | 2/1983 | U.S.S.R. | 55/302 |

Primary Examiner—Bernard Nozick
Attorney, Agent, or Firm—John M. Harrison

[57] ABSTRACT

A filter cleaning apparatus for cleaning air filters such as the air filter on the Abrams M-1 tank, which apparatus includes a cabinet fitted with an air exhaust system, brackets for receiving one or more air filters and an air supply manifold, air inlet manifold and sweep manifold for directing streams of air on the inside and outside element surfaces of the filter or filters and removing dust and dirt lodged in the filter elements. In a preferred embodiment a vibrating mechanism is built into the floor of the apparatus for vibrating the filters while simultaneously directing the streams of air on the inside and outside filter element surfaces and evacuating the dislodged dust and dirt particles from the cabinet.

5 Claims, 3 Drawing Sheets

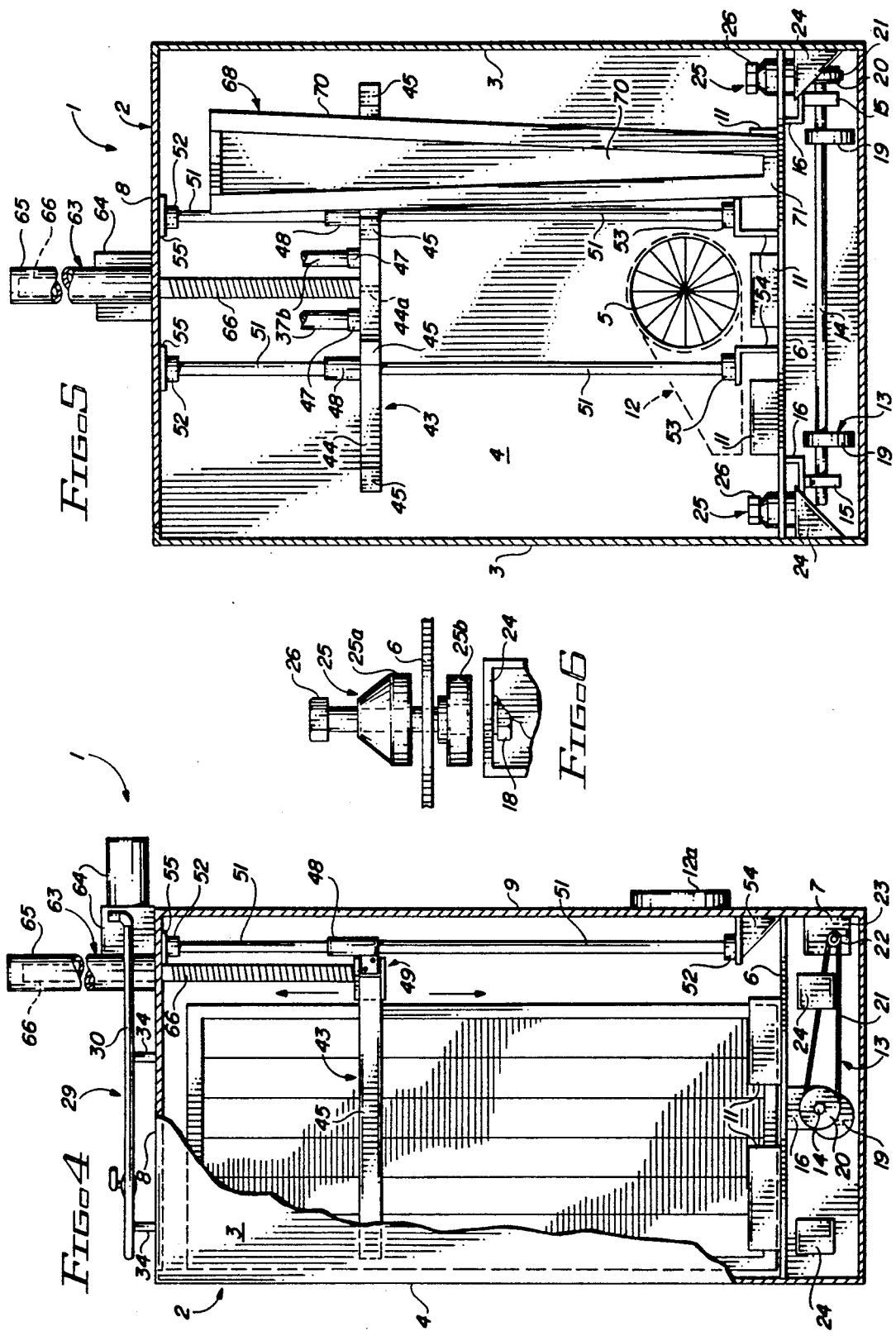

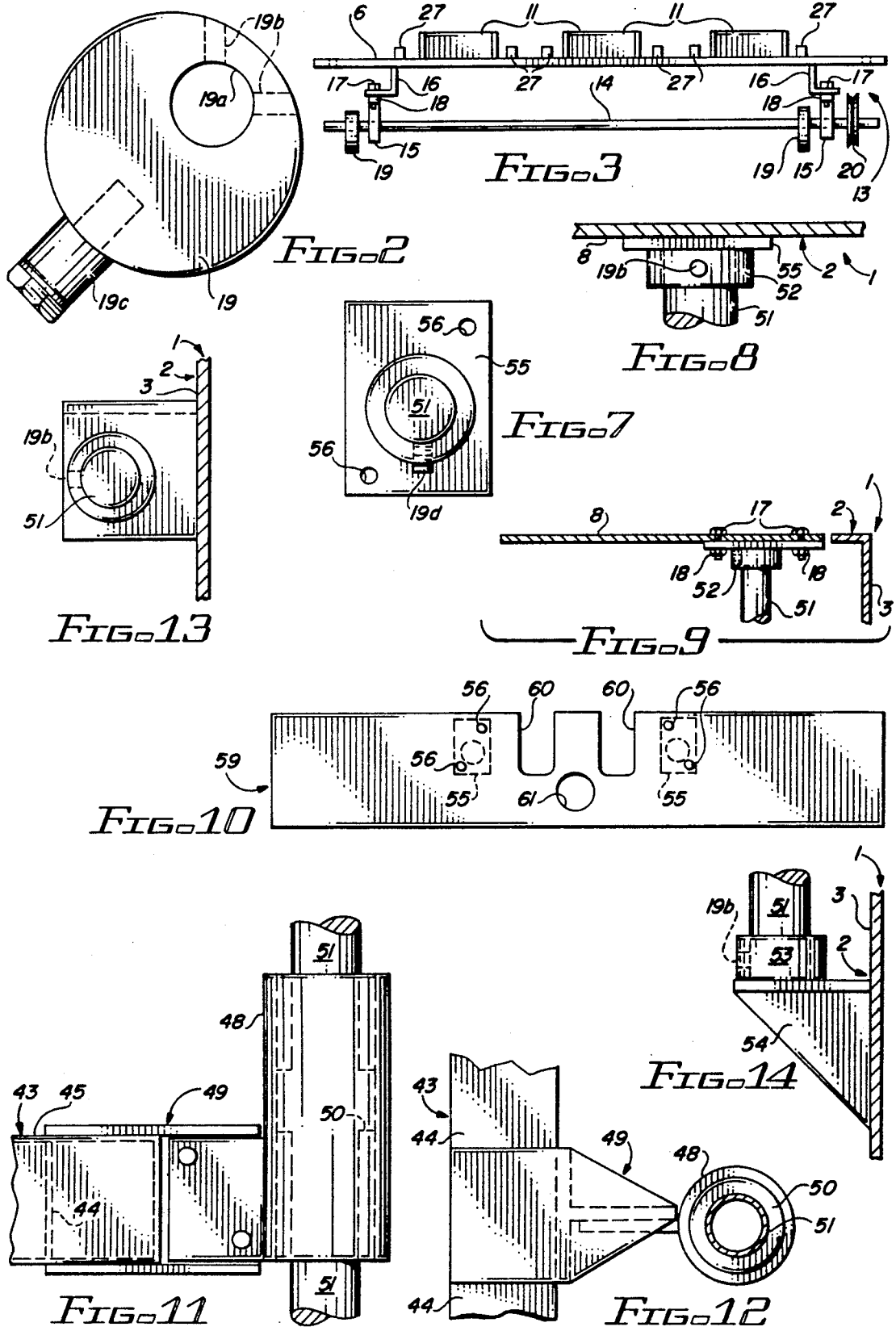

FILTER CLEANING APPARATUS

BACKGROUND OF THE INVENTION

1. Field of the Invention

This invention relates to devices for cleaning air filters and more particularly, to a filter cleaning apparatus for removing dirt and dust particles from the elements of filters such as air filters used in the Abrams M-1 tank. In a preferred embodiment the filter cleaning apparatus is characterized by a portable cabinet or enclosure fitted with brackets for receiving one or more filters, an air supply manifold and air inlet manifold mounted on the cabinet for directing air downwardly inside the filter(s), and a sweep manifold mounted in vertically movable relationship inside the cabinet for directing air against the filter elements of the filters to dislodge dirt and dust from the elements. In another preferred embodiment a vibrating mechanism is built into the floor of the cabinet for vibrating the filters simultaneously with application of air against the filter elements, in order to enhance the cleaning process. An exhaust fan is mounted on the rear of the cabinet and serves to exhaust the dirt and dust-laden air inside the cabinet as the dust and dirt is removed from the filter elements.

Air filters for automotive engines typically include a tightly woven mat of bonded fibers that allow air to pass through, while intercepting airborne particles such as dust. For example, the air filters used on the Abrams M-1 tanks each weight 38 pounds and three such filters are used for each tank. Each filter is capable of collecting almost fifty pounds of dust and sand during the filtering process while operating the tank engines. Generally new filters are about 95% efficient and reach peak efficiency after a few hours of use when a fine layer of dust or grit has covered the filter element, thereby enhancing the filtering action. However, additional layers of dust, grit and sand serve to block the flow of air through the filter and such accumulations tend to drastically reduce the efficiency of the engine which the filter serves. After a predetermined thickness of dirt, grime and grit have collected on the filter element, the element must either be cleaned or replaced to avoid choking the engine and severely limiting performance of the vehicle. In the case of the M-1 Abrams tank, this critical thickness equates to about 46 pounds per filter, including the weight of the filter.

2. Description of the Prior Art

Air filters for vehicles are typically discarded when the accumulation of sand, grit and dust is sufficiently thick to impede the efficiency of the engine which they serve. However, some filters are designed to be washed or cleaned by various techniques and may be reduced one or more times, depending upon the efficiency of the washing or cleaning operation. Aire-Vak International, a division of Southeastern Air Filter of Safford, Ariz., has developed an "Aire-Vak" (trademark) process for cleaning industrial air filters by using a monometer to establish the rate at which air will pass through a new filter. The cleaning takes place by various processes until the air flow through the air filter is restored to or near the established rate. The primary cleaning system implemented is a vacuum process designed to remove dust, grime and dirt which packs the openings in the filter element, thereby restoring the filter for additional use.

It is an object of this invention to provide a new and improved, portable filter cleaning apparatus which is characterized by a cabinet or enclosure for receiving one or more air filters to be cleaned and fitted with an exhaust fan, an external air supply manifold and air inlet manifold and a vertically-movable sweep manifold mounted inside the cabinet, which sweep manifold and air inlet manifold are designed to direct jets of air against the filter element while the exhaust fan exhausts the sand, dirt and grit removed from the filter element during the cleaning process.

Another object of the invention is to provide a new and improved filter cleaning apparatus which includes a cabinet fitted with an air jet system, an exhaust fan and brackets for receiving multiple filters to be cleaned, and a vibrating mechanism built into the floor of the apparatus for vibrating the filters at a selected rate to aid the air jet system in dislodging accumulated dust, grime and debris.

Still another object of this invention is to provide a filter cleaning apparatus which includes an enclosure for receiving multiple air filters to be cleaned, an air jet system built into the cabinet for directing air into and on the filter elements and cleaning the filter elements of accumulated dust, debris and the like and a vibrating mechanism mounted in the cabinet for vibrating the filters and assisting in the cleaning operation.

SUMMARY OF THE INVENTION

These and other objects of the invention are provided in a new and improved, portable filter cleaning apparatus which includes a cabinet fitted with an exhaust fan and provided with doors and brackets for receiving multiple air filters to be cleaned, an air supply manifold and an air inlet manifold mounted on the cabinet and a sweep manifold mounted in the cabinet in vertically sweeping relationship, for direction air both into the filter and against the filter elements and an eccentric-operated vibrating mechanism built into the floor of the cabinet for vibrating the filters and assisting the air stream in removing dust, grime and grit particles are removed from the cabinet by operation of the exhaust fan.

BRIEF DESCRIPTION OF THE DRAWINGS

The invention will be better understood by reference to the accompanying drawings, wherein:

FIG. 2 is a side view of a preferred eccentric used in the vibrating mechanism of the filter cleaning apparatus illustrated in FIG. 1;

FIG. 3 is a front elevation of a preferred embodiment of the vibrating mechanism;

FIG. 4 is a side view, partially in section, of the filter cleaning apparatus illustrated in FIG. 1;

FIG. 5 is a front view, partially in section, of the filter cleaning apparatus illustrated in FIG. 1;

FIG. 6 is an exploded view of a preferred isolater mount system for mounting the bottom panel of the filter cleaning apparatus in vibrating relationship;

FIG. 7 is an end view of a typical sweep manifold rod top mount design;

FIG. 8 is a side view of the sweep manifold rod top mount design illustrated in FIG. 7;

FIG. 9 is an alternative side view of a preferred sweep manifold rod top mount design in the cabinet of the filter cleaning apparatus illustrated in FIG. 8;

FIG. 10 is a top view of a filler plate mounted on the top of the filter cleaning apparatus cabinet illustrated in FIG. 1;

FIG. 11 is a side view of a preferred slide mounting of the sweep manifold to the sweep manifold rods in the filter cleaning apparatus;

FIG. 12 is a top view of the sweep manifold mount illustrated in FIG. 11;

FIG. 13 is an end view of a preferred technique for mounting the bottom end of a sweep manifold rod to the cabinet of the filter cleaning apparatus illustrated in FIG. 1; and FIG. 14 is a side view of the sweep manifold rod mount illustrated in FIG. 13.

DESCRIPTION OF THE PREFERRED EMBODIMENT

Figure 1:
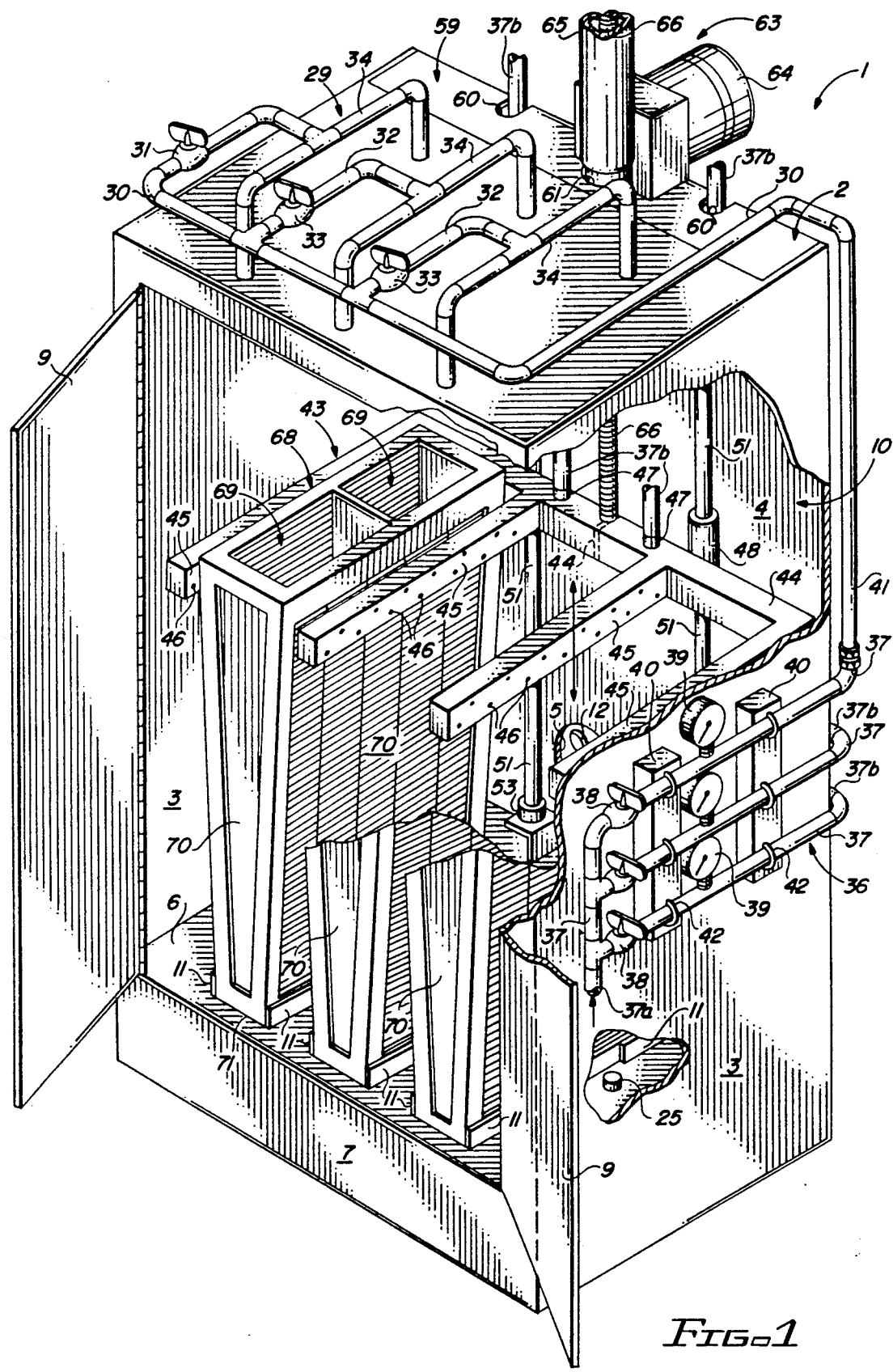
FIG. 1 is a perspective, exploded view of a preferred embodiment of the filter cleaning apparatus of this invention.

Referring initially to FIGS. 1 and 10 of the drawings, in a preferred embodiment the filter cleaning apparatus of this invention is generally illustrated by reference numeral 1. The filter cleaning apparatus 1 includes a cabinet 2, defined by side panels 3, a rear panel 4, having an exhaust port 5 provided therein and a bottom panel 6. A face panel 7 projects across the bottom portion of the front of the cabinet 2 for purposes which will be hereinafter further described. A top panel 8 fits into the cabinet top opening 10 of the cabinet 2, along with a filler plate 59 and the cabinet doors 9 serve to close the cabinet 2, as illustrated. The bottom panel 6 is fitted with multiple, spaced filter brackets 11 which are designed to receive the base 71 of the air filter 68, which is the filter currently used n the Abrams M-1 tank. The air filter 68 is further characterized by top openings 69 and includes front and side elements 70 for filtering air flowing through the air filter 68. Accordingly, it will be appreciated that the air filter 68 may be inserted in the cabinet 2 with the base 71 positioned between the respective sets of filter brackets 11 for cleaning purposes, as hereinafter further described.

An air inlet manifold 29 is mounted on the top panel 8 of the cabinet 2, as further illustrated in FIG. 1 and includes an air inlet pipe 30, fitted with an inlet pip valve 31. One end of the air inlet pipe 30 is attached to a connecting line 41 for receiving incoming air from an air supply manifold 36, attached to a side panel 3, as hereinafter further described. The other end of the air inlet pipe 30 is attached to one of three upward-standing deliver lines 34, each end of which is inserted through openings in the top panel 8 and aligned with the top openings 69, respectively, of the air filter 68, when the air filter 68 is inserted in the cabinet 2, as hereinafter further described. The remaining two delivery lines 34 are spaced from the first delivery line 34 and are each fitted with a separate inlet feeder line 32, one end of which is connected to the air inlet pipe 30 and the other end to the respective delivery line 34, as illustrated in FIG. 1. Each of the inlet feeder lines 32 is fitted with a feeder line valve 33 for controlling the air flow from the air inlet pipe 30 through the respective inlet feeder lien 32 and the corresponding delivery line 34.

The air supply manifold 36 is located on one of the side panels 3 of the cabinet 2 and includes three connected, parallel air supply lines 37, each fitted with a supply line valve 38 and a pressure gauge 39 and mounted on spaced supply manifold mounts 40, (bolted or otherwise attached to the side panel 3) by means of U-bolts 42. The connecting line 41 connects one end of the top air supply line 37 to the receiving or inlet end of the air inlet pipe 30 in the air Inlet manifold 29, as further illustrated in FIG. 1 and heretofore described. An air inlet 37a is provided on the lower air supply line 37 for receiving ambient air.

A sweep manifold 43 is designed to fit inside the cabinet 2 and includes a hollow sweep manifold base 44, provided with four outwardly-extending, hollow sweep manifold fingers 45, having multiple finger openings 46 for directing air from the sweep manifold fingers 45 against the side elements 70 of the air filter 68. The sweep manifold base 44 is fitted with twin base entry ports 47 on each side of a base partition 44a, for receiving air from the two supply line extensions 37b which are directed toward the rear of the cabinet 2, as further illustrated in FIG. 1. The sweep manifold 43 is mounted for vertical movement in an alternating downward and upward sweeping operation inside the cabinet 2, as hereinafter further described.

Referring now to FIGS. 1–6 of the drawings, in a preferred embodiment of the invention the filter cleaning apparatus 1 is characterized by a vibrating mechanism 13 fitted beneath the bottom panel 6 of the cabinet 2 rearwardly of the face panel 7, as illustrated in FIGS. 3, 4 and 5. The vibrating mechanism 13 includes an elongated rod 14 seated in a pair of spaced rod plates 15, which are mounted to the bottom panel 6 in spaced relationship by means of plate brackets 16, respectively. The plate brackets 16 can be bolted or welded to the bottom panel 6, according to the knowledge of those skilled in the art. In a preferred embodiment, the rod plates 15 are bolted to the corresponding plate brackets 16 by means of bracket bolts 17 and nuts 18, as illustrated in FIG. 3. A pair of eccentrics 19 are attached to the rod 14 in spaced relationship and a detail of the eccentrics 19 is illustrated in FIG. 2. In a preferred embodiment, each of the eccentrics 19 is provided with a rod opening 19a and a pair of set screw openings 19b for receiving set screws (not illustrated) and securing the eccentrics 19 tightly on the rod 14. An eccentric extension 19c may be threaded into the eccentrics 19 opposite the rod opening 19a, in order to increase the eccentricity of the eccentrics 19 and promote additional vibration of the bottom panel 6 when the rod 14 is rotated, as hereinafter further described. One end of the rod 14 is fitted with a shaft pulley 20 which receives a drive belt 21, fitted on a drive pulley 22 that is attached to a drive motor 23, as further illustrated in FIG. 4. A pair of isolater mount brackets 24 are attached to each of the side panels 3 and receive the respective mount bottoms 25b of corresponding isolater mounts 25, which are attached to the bottom panel 6, as further illustrated in FIG. 6. The mount top 25a of each isolater mount 25 is designed to seat on the top surface of the bottom panel 6, while the corresponding mount bottom 25b fits against the bottom surface of the bottom panel 6 and each mount top 25a and mount bottom 25b pair is connected by an isolater mount bolt 26 which extends through an opening in the isolater mount bracket 24 and tightens each isolater mount 25 on a corresponding isolater mount bracket 24 by operation of a nut 18, illustrated in FIG. 6. Accordingly, it will be appreciated from a consideration of FIGS. 2–6 that operation of the drive motor 23 facilitates rotation of the rod 14 and both eccentrics 19 to vigorously vibrate the bottom panel 6, which is mounted on the rubber isolater mounts 25, thereby also vibrating the enclosed air filter 68.

Referring now to FIGS 4, 5 and 7–14, the sweep manifold 43 is mounted in the cabinet 2 in vertically sweeping relationship by means of a pair of sweep manifold rods 51, each of which is fitted with a top rod base 52, secured to the filler plate 59 by means of a top rod bracket 55. The top rod brackets 55 and filler plate 59 are further provided with bracket bolt openings 56, illustrated in FIG. 10, for accommodating bracket bolts 17, fitted with nuts 18, as illustrated in FIG. 9 and each top rod base 52 is typically welded to the corresponding top rod bracket 55. The sweep manifold rods 51 may be secured to the respective top rod bases 52 by means of a set screw 19d, threaded into a set screw opening 19b, as illustrated in FIGS. 7 and 8. The bottom ends of the sweep manifold rods 51 are each mounted in a bottom rod base 53, in the same manner, which bottom rod base 53 is welded or otherwise fixed to the horizontal plate of a bottom rod bracket 54, welded or otherwise attached to the side panels 3, respectively, as illustrated in FIGS. 13 and 14. An exhaust fan 12 is illustrated in phantom in FIG. 5 and is mounted on a fan mount block 12a, illustrated in FIG. 4, for sweeping air through the cabinet 2 through the exhaust port 5.

Referring to FIGS. 5, 11 and 12, the sweep manifold base 44 of the sweep manifold 43 is secured to the base collar 48, having an interior collar bushing 50, by means of a base collar bracket 49. The base collar 48 is designed encircle and slidably mount on the sweep manifold rods 51 to facilitate successive upward and downward motion of the entire sweep manifold 43 as the sweep manifold 43 traverses the sweep manifold rods 51, to eject air against the air filter elements 70 of the air filter 68, as illustrated in FIG. 5.

As further illustrated in FIGS. 4 and 5, an actuator 63 is bolted or otherwise fixedly attached to the top panel 8 of the cabinet 2 and includes an actuator motor 64 and an upward-standing, vertically-oriented actuator housing 65 which houses a threaded shaft 66. The extending end of the threaded shaft 66 is welded, bolted or otherwise secured to the sweep manifold base 44 of the sweep manifold 43 to facilitate raising and lowering the entire sweep manifold 43 by operation of the actuator 63. In a preferred embodiment, the actuator 63 is fitted with an automatic reversing mechanism (not illustrated), such that rotation of the threaded shaft 66 according to operation of the drive motor 23 in a selected direction causes the sweep manifold 43 to extend downwardly on the sweep manifold rods 51 to a selected point and then reverse in an upward direction responsive to reversal of the direction of rotation of the actuator motor 64. This sequence is continued for a preselected cleaning cycle of about 10 to 15 minutes to remove the dust, dirt and grit from the air filter element 70 of the air filter 68 located inside the cabinet 2, as illustrated in FIG. 5.

It will be appreciated from a consideration of FIGS. 1, 4 and 10 of the drawings that the actuator 63 is mounted on the filler plate 59 by means of suitable mount bolts (not illustrated), such that the threaded shaft 66 extends downwardly through an actuator access opening 61 provided in the filler plate 59. Furthermore, since the flexible supply line extensions 37b, attached to the bottom air supply lines 37 extending from the air supply manifold 36, must be secured to the cooperating and corresponding base entry ports 47 located on the sweep manifold base 44 of the sweep manifold 43, filler plate slots 60 are provided in the filler plate 59 to accommodate these hoses.

In operation, and referring again to FIGS. 1, 3, 4 and 5 of the drawings, the filter cleaning apparatus 1 is operated to clean an air filter 68 as follows: One or more air filters 68 are initially oriented as illustrated in FIG. 1 with each base 71 inserted between corresponding sets of filter brackets 11 and the top openings 69 of each air filter 68 facing upwardly, as illustrated in FIG. 5. The cabinet doors 9 are then closed and the exhaust fan 12 operated to effect an air flow through the cabinet 2. A central valve (not illustrated) is then operated to facilitate air flow into the air inlet 37a, through the air supply manifold 36 and the connecting line 41 into the air inlet manifold 29. The inlet pipe valve 31 and appropriate feeder lien valves 33 are then opened to facilitate air flow through the corresponding delivery lines 34, where jets of air are forced downwardly into the top openings 69 of the air filter 68. Air is also caused to flow from the supply manifold 36 and bottom pair of air supply lines 37 by manipulation of the corresponding supply lien valves 38, to deliver air through one or both of the supply line extensions 37b and into one or more of the base entry ports 47 of the sweep manifold 43. The air is then directed through the finger openings 46 at relatively high pressure to impinge on the air filter elements 70 of the air filter 68, as further illustrated in FIG. 5. The sweep manifold 43 is caused to move either upwardly or downwardly, depending upon its position with respect to the top panel 8 and the bottom panel 6 of the cabinet 2, by energizing the actuator motor 64. This is accomplished by manipulating a switch (not illustrated) mounted on the actuator motor 64 or otherwise located, according to the knowledge of those skilled in the art. Accordingly, it will be appreciated by that as the air supply manifold 36 moves up and down on the sweep manifold rods 51 pursuant to operation of the threaded shaft 66 and the actuator 63, the air jetting from the respective finger openings 46 impinges upon the entire length of the air filter element 70 and combines with the air jetting from the corresponding delivery lines 34 into the top openings 69 to clean the air filter elements 70. This cleaning function is enhanced by energizing the drive motor 23 in the vibrating mechanism 13 to cause the bottom panel 6 to vibrate and thereby also vibrate the air filter(s) 68. This vibration, in combination with the impingement of the air streams noted above, effects a surprisingly efficient cleaning of the air filter elements 70 and the air filter(s) 68 in a short period of time.

As further illustrated in FIGS. 2 and 3 of the drawings, under circumstances where additional vibration is desired in the filter cleaning apparatus 1, a pair of eccentric extensions 19c can be threaded into the existing eccentrics 19 to increase the eccentricity of the eccentrics 19 and hence, the vibration of the bottom panel 6 and the air filter(s) 68. The vibration of the bottom panel 6 and thus the air filter 68 resting on the bottom panel 6 is effected without significantly vibrating the other elements of the cabinet 2 by operation of the rubber isolator mounts 25, as heretofore described.

It will be appreciated by those skilled in the art that the filter cleaning apparatus of this invention can be constructed in any desired size and configuration, with a selected filter bracket 11 spacing and orientation to accommodate substantially any air filter other than, or in addition to the air filter 68 described herein. Furthermore, the spacing and number of the respective sweep manifold fingers 45 and the vertical travel of the sweep manifold 43 can also be changed to further accommodate any selected filter design.

It will be appreciated from a consideration of FIGS. 1, 4 and 5 that various ones of the inlet pipe valves 31, feeder line valves 33 and supply line valves 38 may be utilized to control air flow to the respective corresponding delivery lines 34 and sets of sweep manifold fingers 45, respectively, depending upon the number of air filters 68 or other air filters which are inserted in the cabinet 2 to be cleaned. Generally, it is desirable to manually control the respective feeder line valves 33 during a cleaning cycle, while allowing the air flowing through the sweep manifold 43 to remain at an essentially constant pressure. However, it will be recognized that adjustment of the feeder line valves 33 will affect the pressure of the air in the sweep manifold 43, since a portion of the air flowing through the air inlet manifold 29 is channelled into the sweep manifold 43.

It will be further appreciated that the cabinet 2 of the filter cleaning apparatus 1 is significantly compact to be placed in a vehicle for field transportation in order to continually clean the air filters 68 for the Abrams M-1 tank or any other vehicle, as the occasion may require. Multiple units of the filter cleaning apparatus 1 can also be placed in various vehicles to accommodate the desired number of air filters 68, according to requirements of the field. Air or an alternative operating fluid such as nitrogen or the like, can be supplied from compressed fluid tanks, fluid compressors or other sources, according to the knowledge of those skilled in the art and may be delivered in pulses or steady streams through the respective delivery lines 34 and sweep manifold fingers 45, as desired.

While the preferred embodiments of the invention have been described above, it will be recognized and understood that various modifications, including alternative air conduit and nozzle configurations, may be made therein and the appended claims are intended to cover all such modifications which may fall within the spirit and scope of the invention.

Having described my invention with the particularity set forth above, what is claimed is:

1. An apparatus for cleaning air filters comprising an enclosure having an air outlet, for removably enclosing the filters; an access door provided in said enclosure for accessing the air filters; an air inlet manifold mounted on the top of said enclosure and a plurality of nozzles extending in fixed relationship from said air inlet manifold through said top for directing air into the filters; an air supply manifold mounted on said enclosure and connected to said air inlet manifold for supplying air to said air inlet manifold; a pair of sweep manifold rods vertically carried by said enclosure; a hollow sweep manifold base mounted on said sweep manifold rods in said enclosure in vertically movable relationship, said sweep manifold base connected to said air supply manifold; actuator means fixedly carried by said enclosure and connected to said sweep manifold base for causing said sweep manifold base to traverse said sweep manifold rods; and a plurality of hollow sweep manifold fingers extending from said sweep manifold base in spaced relationship on both sides of the filters and spaced from the filters for directing air from said air supply manifold through said air inlet manifold, said nozzles and said sweep manifold fingers against the filters and cleaning the filters.

2. The apparatus of claim 1 further comprising vibrating means provided in said enclosure means for vibrating the filters in said enclosure.

3. The apparatus of claim 1 further comprising fan means provided in said air outlet in air communication with said enclosure for exhausting air from said enclosure.

4. The apparatus of claim 1 further comprising:
    (a) vibrating means provided in said enclosure for vibrating the filters in said enclosure; and
    (b) fan means provided in said air outlet in air communication with said enclosure for exhausting air from said enclosure.

5. An apparatus for cleaning air filters of particulate matter, comprising an enclosure for removably enclosing the filters; an access door provided on said enclosure for accessing the air filters; an exhaust port provided in said enclosure and an exhaust fan mounted on said enclosure at said exhaust port for removing air from said enclosure; and air inlet manifold mounted on top of said enclosure and a plurality of nozzles extending from said air inlet manifold in fixed relationship through said top for directing air into the filters; an air supply manifold mounted on said enclosure and connected to said air inlet manifold for supplying air to said air inlet manifold; sweep manifold support means vertically disposed in said enclosure; a hollow sweep manifold base slidably disposed on said sweep manifold support means and connected to said air supply manifold; a plurality of hollow sweep manifold fingers extending from said sweep manifold base in spaced relationship on both sides of the filters and spaced from the filters; an actuator mounted on said enclosure and a threaded rod threadably connected to said sweep manifold base and said actuator for raising and lowering said sweep manifold on said sweep manifold support means; openings provided in said sweep manifold fingers for directing air from said sweep manifold against the air filters; and eccentric-operated cam means mounted in said enclosure for vibrating the filters, loosening the particulate matter from the filters and sweeping the particulate matter from the filters responsive to impingement of air from said nozzles and said openings against the filters and operation of said exhaust fan.

* * * * *